United States Patent [19]
Ohkubo et al.

[11] Patent Number: 6,001,039
[45] Date of Patent: Dec. 14, 1999

[54] ROTATIONAL SPEED DIFFERENCE SENSITIVE TYPE JOINT ASSEMBLY

[75] Inventors: Takashi Ohkubo; Isao Ishikawa; Shinichiro Nakajima, all of Saitama-ken, Japan

[73] Assignee: Zexel Corporation, Tokyo, Japan

[21] Appl. No.: 09/012,378

[22] Filed: Jan. 23, 1998

[51] Int. Cl.$^6$ .......................... F16H 48/30; F16H 48/26; F16H 48/06

[52] U.S. Cl. ................................. 475/88; 475/231; 475/89

[58] Field of Search .................. 475/231, 88, 89, 475/84, 90, 93

[56] References Cited

U.S. PATENT DOCUMENTS

| | | |
|---|---|---|
| 1,462,600 | 7/1923 | Hele-Shaw . |
| 4,957,473 | 9/1990 | Takemura et al. ...................... 475/231 |
| 5,194,053 | 3/1993 | Sano et al. ............................... 475/231 |
| 5,232,410 | 8/1993 | Yanai ....................................... 475/231 |
| 5,358,454 | 10/1994 | Bowen et al. . |

FOREIGN PATENT DOCUMENTS

| | | |
|---|---|---|
| 0315214 | 5/1989 | European Pat. Off. . |
| 0365824 | 5/1990 | European Pat. Off. . |
| 4001070 | 7/1990 | Germany . |
| 2-159423 | 6/1990 | Japan . |
| 7-103902 | 11/1995 | Japan . |

*Primary Examiner*—Charles A Marmor
*Assistant Examiner*—Tisha D. Waddell

[57] ABSTRACT

A working oil receiving chamber 8 is provided with an expanding and contracting member 12. The expanding and contracting member 12 is comprised of an expansible and contractible bellows 2a made of metal, and a bottom portion 12b made of metal and for closing opposite open ends of the bellows portion 12a, so that the member 12 can expand as the pressure of the working oil in the working oil receiving chamber 8 is increased and can contract as the pressure is decreased. A slightly compressed gas is filled in the expanding and contracting member 12.

20 Claims, 4 Drawing Sheets

ROTATIONAL SPEED DIFFERENCE SENSITIVE TYPE JOINT ASSEMBLY

BACKGROUND OF THE INVENTION

This invention relates to a rotational speed difference sensitive type joint assembly disposed between two members which are capable of rotation relative to each other, and for generating a resistance of the size corresponding to the difference in speed between the two members.

The conventional joints of this type include a housing and a rotor which are capable of rotation relative to each other. The rotor is provided with a plurality of cylinder bores. Each cylinder bore receives therein a plunger such that the plunger is capable of reciprocal movement within the bore. Each plunger is urged against a cam face formed on the housing by a spring. Therefore, when the housing and the rotor are rotated relative to each other, each plunger is reciprocally moved. When the plunger moves in one direction, working oil in the cylinder bores flows into a working oil receiving chamber, and when the plunger moves in the other direction, the working oil in the working oil receiving chamber flows into the cylinder bores (see Japanese Patent Unexamined (Kokai) Publication No. 159423/90, Japanese Patent Examined (Kokoku) Publication No. 103902/95, USP495473, etc.).

The working oil within the cylinder bores passes through an orifice when it flows into the working oil receiving chamber. The working oil is subjected to flowing resistance when it passes through the orifice. The working oil within the cylinder bores are pressurized by this flowing working oil within the cylinder bores are pressurized by this flowing resistance. The pressurized working oil urges each plunger against the cam face to generate frictional resistance between each plunger and the cam face. The housing and the rotor are limited in their relative rotation by the flowing resistance which occurs when the working oil passes through the orifice and by the frictional resistance which is generated between each plunger and the cam face. In other words, the torque corresponding to the flowing resistance and the frictional resistance is transmitted from the housing (or rotor) which is rotating at a high speed, to the rotor (or housing) which is rotating at a low speed.

When the housing and the rotor are rotating relative to each other, the working oil is heated by heat generated when the working oil passes through the orifice or by heat caused by the friction between the plunger and the cam face. On the other hand, when the housing and the rotor are stopped, the working oil is cooled by natural radiation. Therefore, the working oil repeats expansion and contraction. For this reason, if the volume of the working oil receiving chamber is constant, the pressure of the working oil is greatly fluctuated.

In view of the above, in a rotational speed difference sensitive type joint assembly disclosed in the Japanese Patent Unexamined (Kokai) Publication No. 159423/90, a piston biased by a spring towards an inner side of the working oil receiving chamber is slidably disposed within the working oil receiving chamber, the expansion and contraction of the working oil are absorbed by moving the piston in accordance with the expansion and the contraction of the working oil, and the pressure within the working oil receiving chamber is maintained generally constant.

However, in the above-mentioned conventional rotational speed difference sensitive type joint assembly having a piston in the working oil receiving chamber, various kinds of parts, such as a piston, a spring and a seal member for sealing a space between the piston and the cylinder bore are required. Therefore, the number of parts is increased and the manufacturing cost is increased to that extent. Further, since the piston repeats its reciprocal movement in accordance with the expansion and contraction of the working oil, the seal member is gradually worn and the working oil within the working oil receiving chamber is liable to leak outside.

SUMMARY OF THE INVENTION

The feature of the present invention resides in a rotational speed difference sensitive type joint assembly comprising:

a housing having a cam face extending annularly about an axis of rotation thereof;

a rotor connected to the housing for relative rotation with the housing about the axis of rotation and including a plurality of cylinder bores at an area opposing the cam face;

a plunger slidably disposed within each of the cylinder bores and urged against the cam face by spring means, so that the plunger can move reciprocally in accordance with relative rotation between the housing and the rotor; and a working oil receiving chamber formed in the housing or in the rotor, or between the housing and the rotor, and adapted to receive therein working oil;

a supply passage adapted to allow the working oil within the working oil receiving chamber to flow into each of the cylinder bores when the plunger is moved by the spring means towards the cam face, and a return path adapted to allow the working oil within each of the cylinder bores to flow into the working oil receiving chamber, being formed between each of the cylinder bores and the working oil receiving chamber;

the supply path being provided with a check valve for preventing the working oil from flowing into the working oil receiving chamber from each of the cylinder bores;

the return path being provided with an orifice for resisting against the flow of the working oil; and the working oil receiving chamber being provided therein with an expanding and contracting member which is contracted as the pressure of the working oil within the working oil receiving chamber is increased and which is expanded as the pressure of the working oil is reduced.

DETAILED DESCRIPTION OF THE INVENTION

One embodiment of the present invention will be described hereinafter with reference to FIGS. 1 through 5 of the accompanying drawings.

Figure 1:
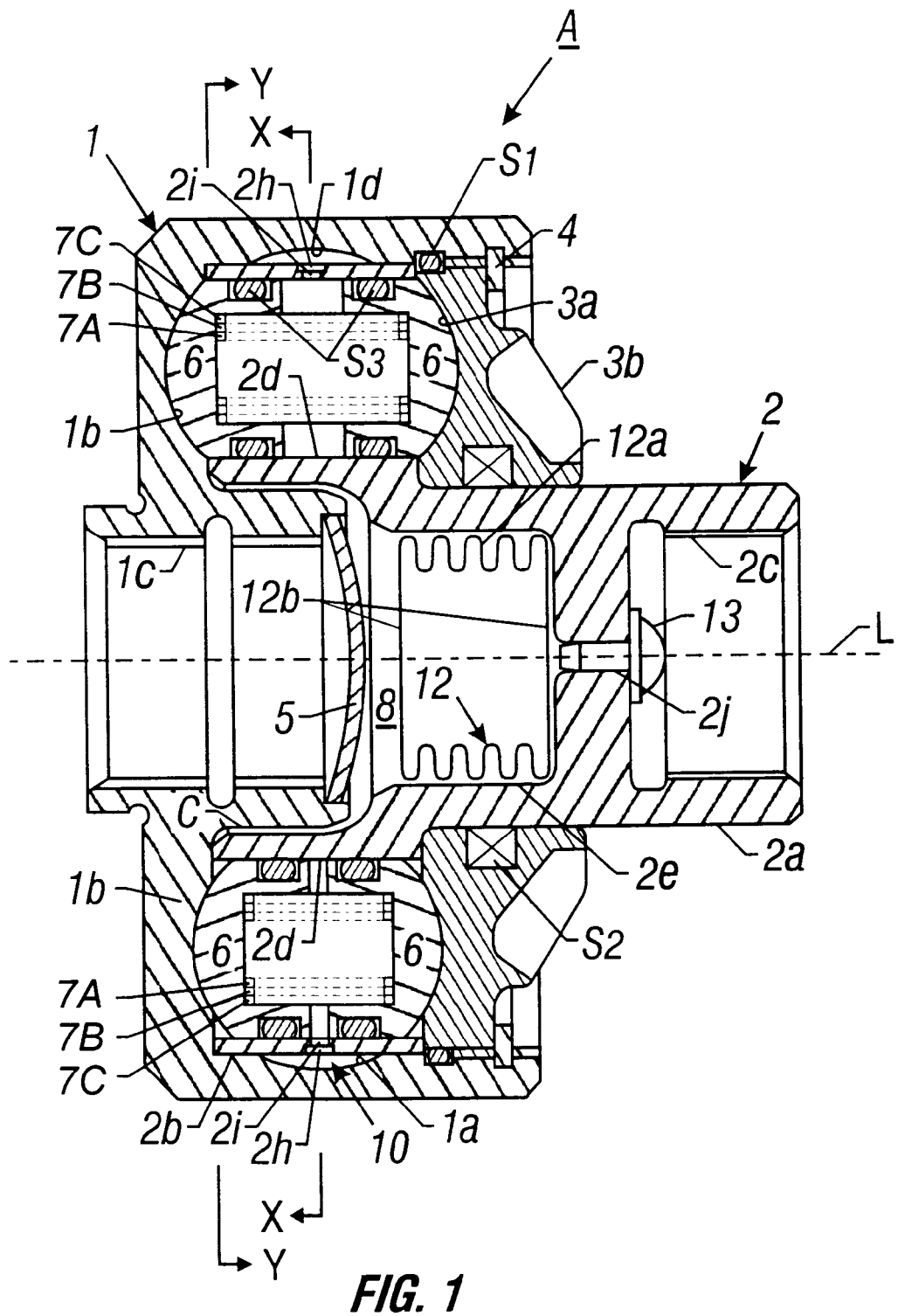
FIG. 1 is a vertical sectional view showing one embodiment of a rotational speed difference sensitive type joint assembly according to the present invention.

As shown in FIG. 1, a rotational speed difference sensitive type joint assembly (hereinafter sometimes simply referred to as the "joint assembly") A is disposed, for example, between the left and right wheels of an automobile and suited to be used as a differential limiter. The joint assembly A comprises a housing 1 and a rotor 2 which are capable of rotation relative to each other about an axis L.

A receiving cavity 1a having a circular configuration in section is formed in one end face (right end face of FIG. 1) of the housing 1. The receiving cavity 1a extends on the axis L towards the other end of the housing 1. A ring-like cam plate 3 is unrotatably provided on an opening portion of the receiving cavity 1a, for example, through spline connection or the like. This cam plate 3 is prevented from escaping from the interior of the receiving cavity 1a by a stop ring 4. Cam faces 1b, 3a are formed on mutually opposing end face of the cam plate 3 and a bottom surface of the receiving cavity 1a, respectively. The cam faces 1b, 3a extend annularly about the axis L. The cam faces 1b, 3a have the same configuration and the same dimension except that they are opposite in phase. A gear portion 3b is formed on an outer end face of the cam plate 3. This gear portion 3b is served as one of the two side gears when the joint assembly A is built in a differential gear unit D (see FIG. 5) as later described.

Reference symbol S1 denotes a seal member comprised of an O-ring or the like, for sealing the inner peripheral surface of the receiving cavity 1a and the outer peripheral surface of the cam plate 3.

A spline cavity 1c is formed in the other end face of the housing 1. This spline cavity 1c extends on the axis L towards one end of the housing 1 and is open at the bottom surface of the receiving cavity 1a. One of a pair of relatively rotating shafts, for example, left and right axles, is connected to this spline cavity 1c. The spline cavity 1c is provided at an inner opening portion thereof with a shielding plate 5. The inner end portion of the spline cavity 1c is closed with this shielding plate 5.

The rotor 2 comprises a shaft portion 2a, and a disc portion 2b integral with one end portion of the shaft portion 2a. The shaft portion 2a rotatably pierces into a central portion of the cam plate 3. A seal member S2 is provided between the shaft portion 2a and the cam plate 3. A spline cavity 2c is formed in the outer end face of the shaft portion 2a. The other axle is unrotatably connected to the spline cavity 2c. On the other hand, the disc portion 2b is rotatably received in the receiving cavity 1a. The disc portion 2b is formed with a plurality (six in this embodiment) of cylinder bores 2d in such a manner as to extend all the way through the disc portion 2b. The cylinder bores 2d are arranged parallel to the axis L and at equal intervals in the circumferential direction.

Plungers 6, 6 are slidably inserted into one and the other end portions of each cylinder bore 2d. The plungers 6, 6 are biased by three springs (biasing means) 7A, 7B, 7C, which are disposed therebetween, in a direction away from each other so as to be abutted with the cam faces 1b, 3a. Therefore, when the housing 1 and the rotor 2 are rotated relative to each other, the plungers 6, 6 are reciprocally moved towards and away from each other. The plungers 6, 6 may be biased by a single spring. Working oil is filled in the cylinder bores 2d between the one pair of plungers 6, 6. A space between the outer peripheral surface of the plunger and the inner peripheral surface of the cylinder bore 2d is sealed with a seal member S3 comprised of an O-ring or the like. Therefore, the working oil within the cylinder bore 2d never escapes outside from between the inner peripheral surface of the cylinder bore 2d and the outer surface of the plunger 6.

A cavity 2e is formed in the end face of the rotor 2 opposing the shielding plate 5. The internal space of the cavity 2e is tightly sealed by the shielding plate 5 with respect to the outside. This tightly sealed internal space is served as a working oil receiving chamber 8. Working oil is filled into the working oil receiving chamber 8 through an inlet port 2j opening at the outer surface of the rotor 2. The inlet port 2j is closed with a threaded member 13 threadingly engaged therewith.

The working oil receiving chamber 8 is in communication with the cylinder bore 2d through a supply path 9, and with the cylinder bore 2d through a return path 10.

Figure 2:
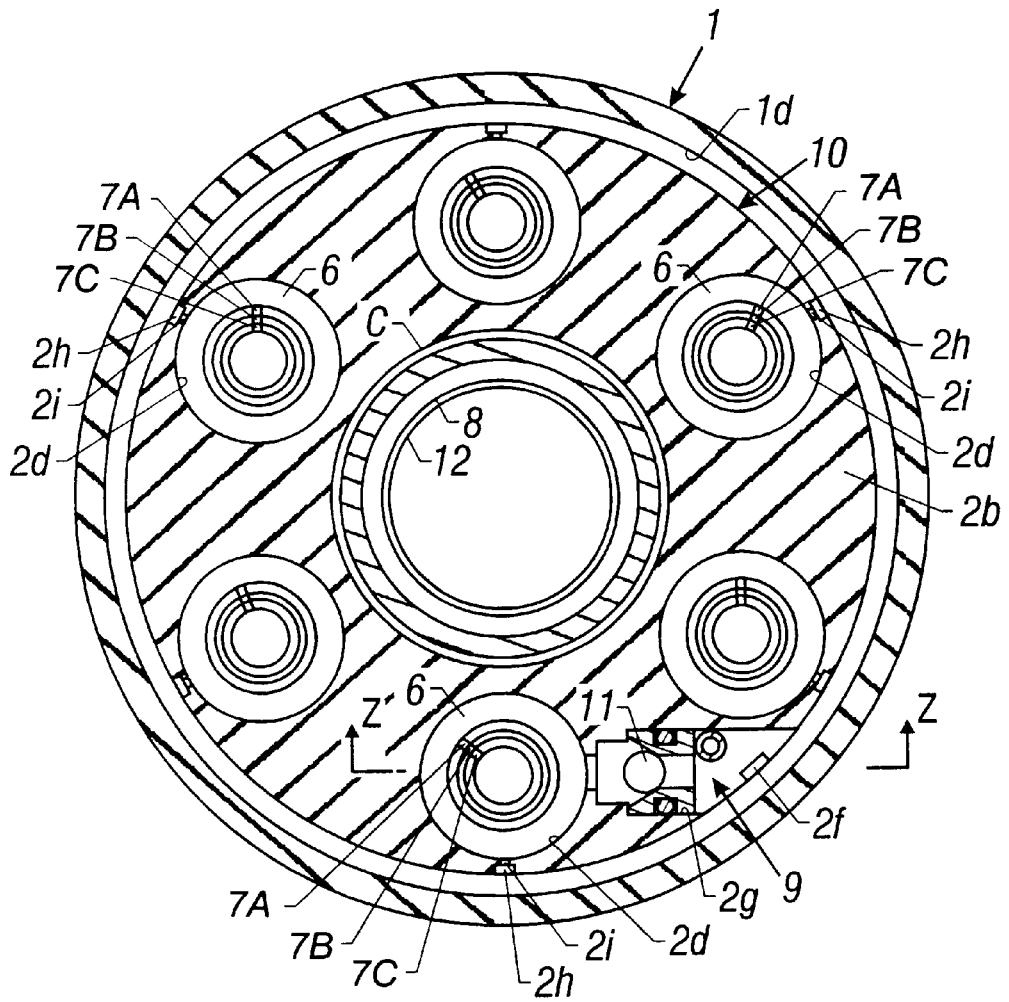
FIG. 2 is a sectional view taken on line X—X of FIG. 1.
Figure 3:
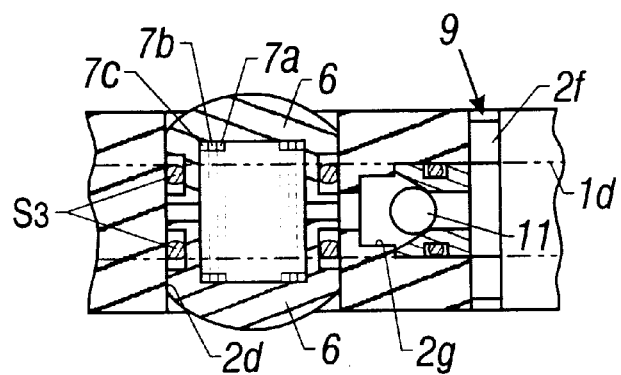
FIG. 3 is a sectional view taken on line Z—Z of FIG. 2.
Figure 4:
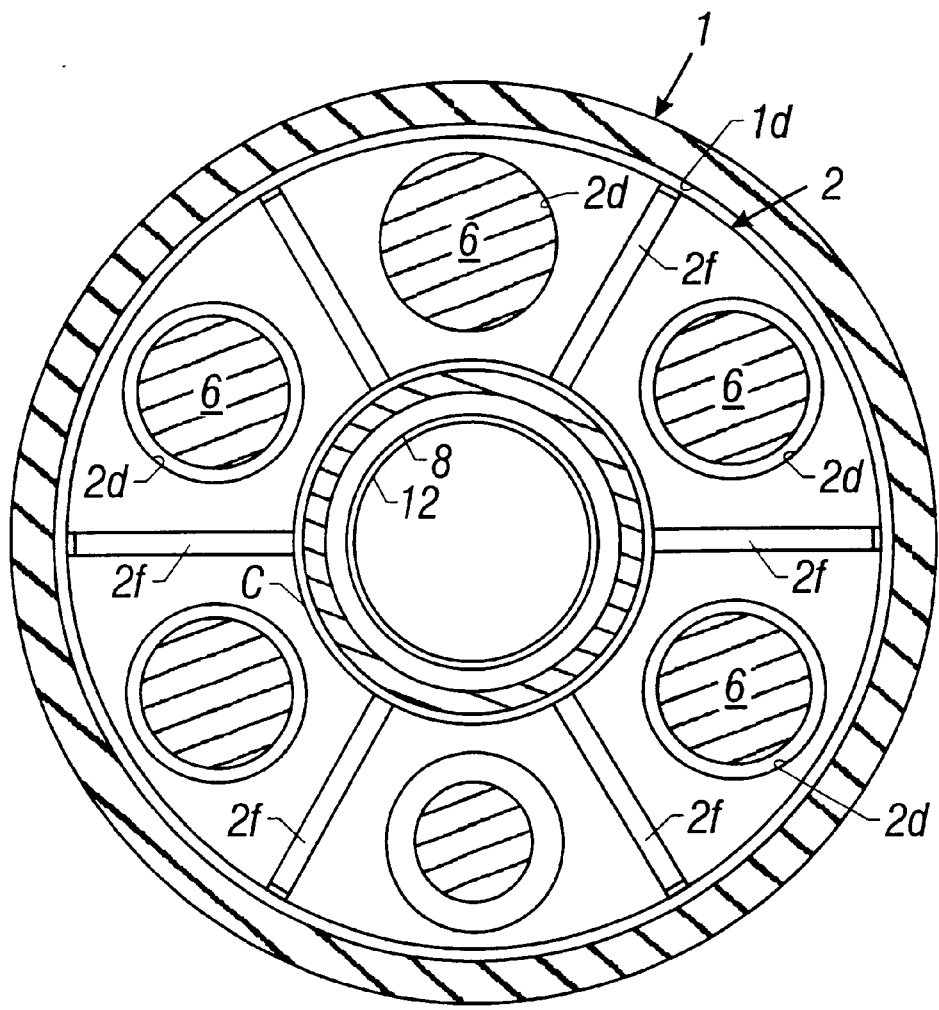
FIG. 4 is a sectional view taken on line Y—Y of FIG. 1.

As shown in FIGS. 2, 3 and 4, the supply path 9 comprises an annular gap C formed between the housing 1 and the rotor 2, a communication groove 2f formed in an end face (the end face on the side of the cam face 1b) of the disc portion 2b of the rotor 2 and an outer peripheral surface of the disc portion 2b, an annular groove 1d formed in the inner peripheral surface of the receiving cavity 1a of the housing 1, and a communication cavity 2g extending from the outer peripheral surface of the disc portion 2b to the cylinder bore 2d. The communication cavity 2g is provided therein with a check valve 11 for allowing the passage of the working oil from the working oil receiving chamber 8 to the cylinder bore 2d but preventing the passage of the working oil in the opposite direction. Therefore, the working oil within the working oil receiving chamber 8 flows into the cylinder bore 2d through the supply path 9 but the working oil within the cylinder bore 2d does not flow into the working oil receiving chamber 8 through the supply path 9. Although one each of the communication groove 2f and the communication cavity 2g are shown in FIG. 2, they are actually provided in each cylinder bore 2d.

On the other hand, the return path 10 comprises the gap C, the communication groove 2f, and a through-hole 2h one end of which is open at the outer peripheral surface of the disc portion 2b opposing the annular groove 1d and the other end of which is open at the cylinder bore 2d. The through-hole 2h is formed with an orifice 2i. Therefore, the working oil within the cylinder bore 2d is subjected to flowing resistance when it flows into the working oil receiving chamber 8 through the return path 10.

As shown in FIG. 1, an expanding and contracting member 12 is received in the working oil receiving chamber 8. This expanding and contracting member 12 comprises an accordion-like bellows portion 12a made of metal or resin, which can be expanded and contracted in the axial direction, and a bottom portion 12b made of metal or resin, for closing the opposite end portions of the bellows portion 12a. Therefore, the expanding and contracting member 12 can expand and contract in accordance with expansion and contraction of the bellows portion 12a. Gas such as air is confined in its slightly compressed state within the expanding and contracting member 12. Therefore, the expanding and contracting member 12 is normally ready to expand to thereby maintain the interior pressure of the working oil receiving chamber 8 at a prescribed level.

In the rotational speed difference sensitive type joint assembly A thus constructed, when the housing 1 and the rotor 2 are rotated relative to each other, the plungers 6, 6 are moved towards and away from each other. When the plungers 6, 6 are moved towards each other, the working oil within the cylinder bore 2d is returned to the working oil reserving chamber 8 through the return path 10. At that time, the working oil is subjected to flowing resistance by the orifice 2i. As a consequence, the working oil within the cylinder bore 2 is pressurized, and the plungers 6, 6 are urged against the cam faces 1b, 3a, respectively, by the pressure. As a consequence, a frictional resistance is generated between the plungers 6, 6 and the cam faces 1b, 3a. By the flowing resistance due to a provision of the orifice 2i and by the frictional resistance generated between the plungers 6, 6 and the cam faces 1b, 3a, the relative rotation between the housing 1 and the rotor 2 is limited. In other words, the torque corresponding to the flowing resistance and the frictional resistance is transmitted to the rotor 2 (or the housing 1) which is rotating at a low speed from the housing 1 (or the rotor 2) which is rotating at a high speed.

Since the pressure within the cylinder bore 2d becomes negative when the plungers 6, 6 are moved away from each other, the check valve 11 is opened to allow the working oil within the working oil receiving chamber 8 to flow into the cylinder bore 1d through the supply path 9.

Here, when the working oil passes through the orifice 2i, heat attributable to pressure losses is generated, and a frictional heat is generated between the plungers 6, 6 and the cam faces 1b, 3a. This causes the working oil to be heated for expansion. When the working oil is expanded, the expanding and contracting member 12 is contracted to the extent of expansion. On the other hand, when the working oil is cooled for contraction during the stop of the relative rotation between the housing 1 and the rotor 2, the expanding and contracting member 12 is expanded to the extent of contraction. Therefore, the pressure of the working oil is hardly fluctuated and maintained generally at a constant level. Moreover, since the expanding and contracting member 12 is received in its contracted state within the working oil receiving chamber 8, even if the working oil should be leaked slightly from the working oil receiving chamber 8, the leaked portion can be absorbed by the expansion of the expanding and contracting member 12. Thus, the possible decrease of pressure within the working oil receiving chamber 8 caused by the leakage can be prevented from occurring.

Since the expanding and contracting member 12 is a single member, the number of parts can be reduced compared with the conventional joint assembly in which the piston is disposed within the working oil receiving chamber. Moreover, the number of processes for assembly can be reduced. By this, the manufacturing cost of the joint A can be reduced. Furthermore, the expanding and contracting member 12 is merely expanded and contracted, and never slid with respect to the working oil receiving chamber 8. Therefore, there is no need of a provision of a seal member between the expanding and contracting member 12 and the working oil receiving chamber 8. Thus, the working oil can be assuredly prevented from leaking from the working oil receiving chamber 2 even if it is used for a long period of time.

Since the expanding and contracting member 12 has a hollow interior, it can be reduced in weight. By doing so, the joint assembly A as a whole can be reduced in weight. Moreover, since the expanding and contracting member 12 is made of metal, it is never dissolved in the working oil. Therefore, the expanding and contracting member 12 can be used for a long period of time.

Figure 5:
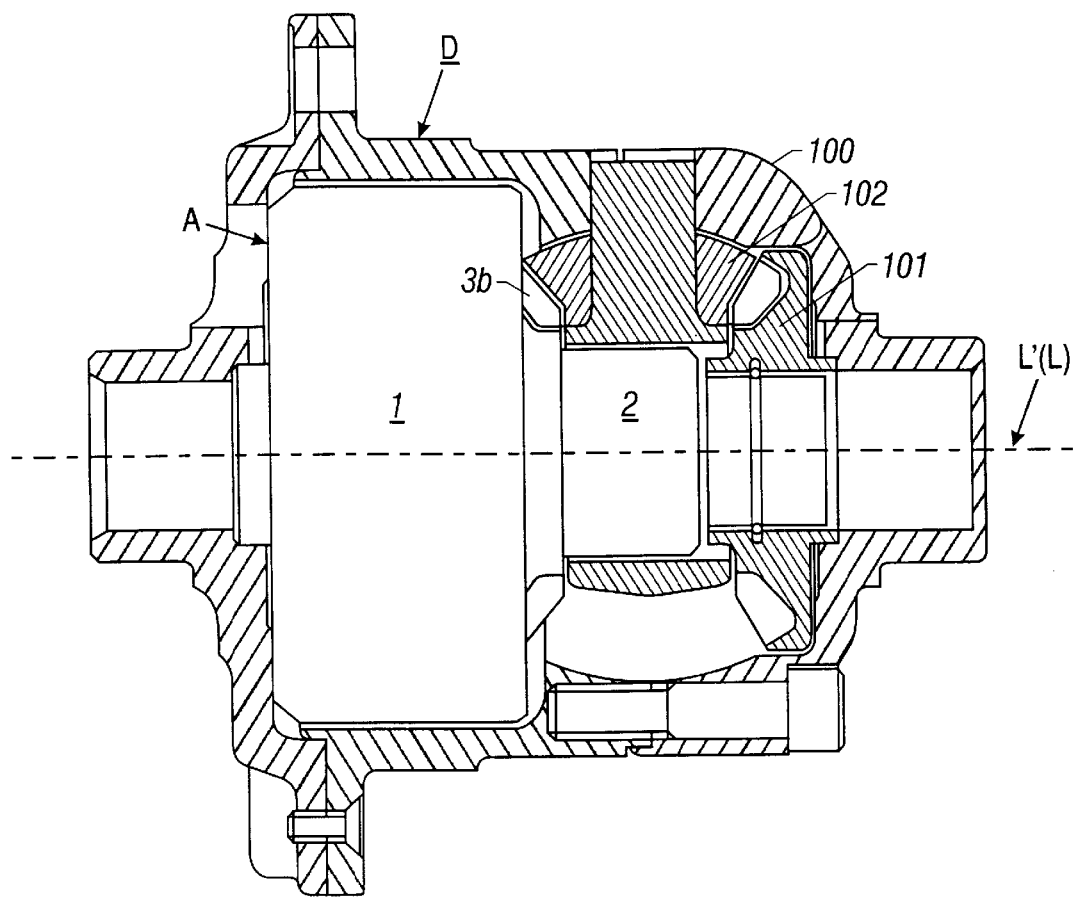
FIG. 5 is a sectional view showing a differential gear unit with the joint assembly of FIG. 1 built therein.

Next, one use example of the joint assembly A thus constructed will be described. As shown in FIG. 5, the joint assembly A is built in the differential gear unit D and used as a differential limiter.

Specifically, the differential gear unit D is disposed between the front wheels and the rear wheels or between the left and right wheels, in order to allow a differential rotation therebetween. The differential gear unit D includes a differential case 100 which is rotationally driven about an axis L'. A side gear 101 rotatable about the axis L' and at least one pinion gear 102 engaged with the side gear 101 are rotatably disposed within the differential case 100 at one end of the differential case 100. The side gear 101 includes the same gear specifications as the gear portion 3b formed on the cam plate 3 of the joint assembly A.

The joint assembly A is received in the differential case 100 with its axis L aligned with the axis L'. The gear portion 3b of the joint assembly A is in engagement with the pinion gear 102. Therefore, the housing 1 of the joint assembly A acts as a side gear forming a pair with the side gear 101, and one of the left and right axles is unrotatably connected to its spline cavity 1c. On the other hand, the other axle is unrotatably connected to the spline cavity of the rotor 2 of the joint A This second-mentioned axle is also unrotatably connected to the side gear 101 through spline connection or the like. Therefore, the rotor 2 acts in unison with the side gear 101. Thus, when the left and right wheels are differentially rotated, the housing 1 and the rotor 2 are rotated relative to each other in accordance with the differential rotation. As a consequence, the torque for preventing the relative rotation occurs to the joint assembly A, thereby the differential rotation of the left and right wheels is limited and the torque is transmitted towards the wheels which are rotating at a low speed from the wheels which are rotating at a high speed.

The present invention should not be limited to the above embodiment, and various changes and modifications can be made in accordance with necessity.

For example, in the above embodiment, although the cylinder bore 2d is a through-hole and the plungers 6, 6 are arranged on opposite end portions thereof, the cylinder bore may have a blind hole and only one plunger may be provided. Further, although the cylinder bores are parallel to the axis L of rotation of the housing 1 and the rotor 2, they may be formed in a direction perpendicular to the axis L and the cylinder bores may be radially arranged.

In the above embodiment, although the working oil receiving chamber 8 is formed between the housing 1 and the rotor 2, it may be formed within the housing 1 or within the rotor 2.

What is claimed is:

1. A rotational speed difference sensitive type joint assembly comprising:

a sleeve-like housing having end portions;

a pair of cam faces formed on the end portions of said housing, said cam faces being formed annularly about a rotational axis of said housing and opposing each other in a direction of said rotational axis of said housing;

a rotor disposed between a pair of cams within said housing, said rotor being relatively rotatable connected to said housing about said rotational axis of said housing;

a plurality of cylinder bores formed in said rotor to extend through said rotor, wherein opening portions at opposing ends of said cylinder bores oppose said pair of cam faces;

a pair of plungers slidably disposed on opposite end portions of each said cylinder bore; and a biasing means interposed between said pair of plungers within each said cylinder bore, said biasing means biasing said pair of plungers in directions away from each other against said pair of cam faces, wherein said pair of plungers reciprocally slide in response to relative rotational movements of said housing and said rotor; and a working oil receiving chamber formed in said housing or in said rotor, or between said housing and said rotor, and adapted to receive therein working oil;

a supply passage adapted to allow the working oil within said working oil receiving chamber to flow into each of said cylinder bores when said pair of plungers are moved by said spring means towards said pair of cam faces, and a return path adapted to allow the working oil within each of said cylinder bores to flow into said working oil receiving chamber, being formed between each of said cylinder bores and said working oil receiving chamber;

said supply path being provided with a check valve for preventing the working oil from flowing into said working oil receiving chamber from each of said cylinder bores;

said return path being provided with an orifice for resisting against the flow of the working oil; and said working oil receiving chamber being provided therein with an expanding and contracting member which is contracted as the pressure of the working oil within said working oil receiving chamber is increased and which is expanded as the pressure of the working oil is reduced.

2. A rotational speed difference sensitive type joint assembly according to claim 1, wherein said expanding and contracting member are disposed in a contacted state thereof within said working oil receiving chamber so that a prescribed pressure can be applied to the working oil within said working oil receiving chamber.

3. A rotational speed difference sensitive type joint assembly according to claim 1, wherein said expanding and contracting member comprises a hollow member with gas filled therein.

4. A rotational speed difference sensitive type joint assembly according to claim 3, wherein said hollow member comprises a bellows made of metal and having closed ends.

5. A rotational speed difference sensitive type joint assembly according to claim 1, wherein said housing or said rotor is provided on an outer surface thereof with an inlet port for charging working oil into said working oil receiving chamber therethrough, and said inlet port is threadingly engaged with a threaded member for closing said inlet port.

6. A rotational speed difference sensitive type joint assembly according to claim 1, wherein said cylinder bores are formed in parallel with said axis of rotation.

7. A rotational speed difference sensitive type joint assembly according to claim 2, wherein said expanding and contracting member comprises a hollow member with gas filled therein.

8. A rotational speed difference sensitive type joint assembly according to claim 7, wherein said hollow member comprises a bellows made of metal and having closed ends.

9. A rotational speed difference sensitive type joint assembly according to claim 2, wherein said housing or said rotor is provided on an outer surface thereof with an inlet port for charging working oil into said working oil receiving chamber therethrough, and said inlet port is threadingly engaged with a threaded member for closing said inlet port.

10. A rotational speed difference sensitive type joint assembly according to claim 3, wherein said housing or said rotor is provided on an outer surface thereof with an inlet port for charging working oil into said working oil receiving chamber therethrough, and said inlet port is threadingly engaged with a threaded member for closing said inlet port.

11. A rotational speed difference sensitive type joint assembly according to claim 4, wherein said housing or said rotor is provided on an outer surface thereof with an inlet port for charging working oil into said working oil receiving chamber therethrough, and said inlet port is threadingly engaged with a threaded member for closing said inlet port.

12. A rotational speed difference sensitive type joint assembly according to claim 7, wherein said housing or said rotor is provided on an outer surface thereof with an inlet port for charging working oil into said working oil receiving chamber therethrough, and said inlet port is threadingly engaged with a threaded member for closing said inlet port.

13. A rotational speed difference sensitive type joint assembly according to claim 8, wherein said housing or said rotor is provided on an outer surface thereof with an inlet port for charging working oil into said working oil receiving chamber therethrough, and said inlet port is threadingly engaged with a threaded member for closing said inlet port.

14. A rotational speed difference sensitive type joint assembly according to claim 2, wherein said cylinder bores are formed in parallel with said axis of rotation.

15. A rotational speed difference sensitive type joint assembly according to claim 3, wherein said cylinder bores are formed in parallel with said axis of rotation.

16. A rotational speed difference sensitive type joint assembly according to claim 4, wherein said cylinder bores are formed in parallel with said axis of rotation.

17. A rotational speed difference sensitive type joint assembly according to claim 5, wherein said cylinder bores are formed in parallel with said axis of rotation.

18. A rotational speed difference sensitive type joint assembly according to claim 7, wherein said cylinder bores are formed in parallel with said axis of rotation.

19. A rotational speed difference sensitive type joint assembly according to claim 8, wherein said cylinder bores are formed in parallel with said axis of rotation.

20. A rotational speed difference sensitive type joint assembly according to claim 9, wherein said cylinder bores are formed in parallel with said axis of rotation.

* * * * *